(12) United States Patent  
Stein

(10) Patent No.: US 9,089,250 B2  
(45) Date of Patent: Jul. 28, 2015

(54) VACUUM CLEANER WITH MOTOR SPEED INDICATOR

(75) Inventor: Thomas Stein, Velbert (DE)

(73) Assignee: Stein & Co. GmbH, Velbert (DE)

( * ) Notice: Subject to any disclaimer, the term of this patent is extended or adjusted under 35 U.S.C. 154(b) by 1132 days.

(21) Appl. No.: 13/069,616

(22) Filed: Mar. 23, 2011

(65) Prior Publication Data

US 2011/0232687 A1    Sep. 29, 2011

(30) Foreign Application Priority Data

Mar. 23, 2010   (DE) .......................... 10 2010 012 643

(51) Int. Cl.
*A47L 9/30*   (2006.01)
*B08B 5/04*   (2006.01)
*A47L 9/28*   (2006.01)

(52) U.S. Cl.
CPC ............. *A47L 9/2857* (2013.01); *A47L 9/2831* (2013.01); *A47L 9/2842* (2013.01); *Y02B 40/82* (2013.01)

(58) Field of Classification Search
CPC ....... A47L 9/2842; A47L 9/2857; A47L 9/19; A47L 9/2889; A47L 9/02; A47L 9/30; A47L 5/30
USPC ................................ 15/319, 339, 324; 134/21
See application file for complete search history.

(56) References Cited

U.S. PATENT DOCUMENTS

| 4,733,431 A * | 3/1988 | Martin ............................. 15/339 |
| 2007/0113361 A1* | 5/2007 | Reese et al. .................... 15/41.1 |
| 2010/0229892 A1* | 9/2010 | Reese et al. ....................... 134/6 |

* cited by examiner

*Primary Examiner* — Dung Van Nguyen
(74) *Attorney, Agent, or Firm* — W. F. Fasse

(57) ABSTRACT

A vacuum cleaner includes a variable speed suction motor and an illuminatable motor speed indicator having plural lights arranged in a circular pattern or annular ring pattern, for example around a motor speed control switch. A control unit includes an indicator controller and a motor controller that respectively control the illuminatable indicator and the motor, based on inputs from the motor speed control switch and optionally at least one sensor that senses operating conditions of the vacuum cleaner. The lights are successively activated and deactivated to create a visible light spot that appears to rotate around the circular or annular ring pattern at a light rotation rate related to and indicative of the motor rotation speed. Thereby the indicator allows the vacuum suction power to be visually monitored.

20 Claims, 1 Drawing Sheet

VACUUM CLEANER WITH MOTOR SPEED INDICATOR

PRIORITY CLAIM

This application is based on and claims the priority under 35 USC §119 of German Patent Application 10 2010 012 643.8, filed on Mar. 23, 2010, the entire disclosure of which is incorporated herein by reference.

FIELD OF THE INVENTION

The invention relates to a vacuum cleaner with a power-regulated variable speed suction motor, and with an illuminated indicator of an operating condition of the vacuum cleaner.

BACKGROUND INFORMATION

It is known in the field of vacuum cleaners to provide an indicator arrangement including one or more lights to optically indicate an operating condition of the vacuum cleaner to the user of the vacuum cleaner. However, it has been found that the existing conventional indicator arrangements do not provide a sufficiently recognizable indication of the adjusted or selected suction power of the vacuum cleaner dependent on the current actual operating condition.

SUMMARY OF THE INVENTION

It is an object of one or more embodiments of the invention to provide a method and an apparatus including an illuminatable indicator by which an adjusted or selected suction power of the suction motor of a vacuum cleaner can be indicated by a readily visible and easily recognizable signal to a user of the vacuum cleaner. Related thereto, it is a further object of one or more embodiments of the invention to enable the suction motor running speed and therewith the suction power to be optically monitored during the actual use of the vacuum cleaner, in order to allow appropriate suction power settings to be selected for different applications. One or more embodiments of the invention further aim to overcome the disadvantages of the prior art, and achieve additional advantages, as apparent from the present specification. The attainment of these objects is, however, not a required limitation of the claimed invention or inventions.

The above objects have been achieved according to an embodiment of the invention in a vacuum cleaner including a vacuum cleaner housing, a suction motor in the housing, a motor speed control switch, an illuminatable motor speed indicator, and at least one electronic or electrical controller. The motor speed indicator includes a plurality of lights arranged in a light pattern that is a circular pattern and/or an annular ring pattern. The lights may be any light emitting elements, such as light emitting diodes, incandescent light bulbs, fluorescent light bulbs, electroluminescent elements, or optical fibers conducting and emitting light from one or more light sources. The at least one controller is or are conductively connected to the suction motor, to the motor speed control switch and to the lights. The term "conductively connected" means connected in any manner so as to conduct a signal or energy, for example via an electrical conductor wire, an electrical conductor circuit trace, or an optical fiber. The at least one controller can be a single unitary controller, or can include plural separate controllers, or can include plural controllers that are incorporated together in a single control unit. The at least one controller is or are adapted to control a motor rotation speed of the suction motor dependent on and responsive to a setting of the motor speed control switch. The at least one controller is or are further adapted to successively activate and deactivate respective ones or groups of the lights at a light succession rate that is dependent on the motor rotation speed of the suction motor, which thereby creates a visible light spot that appears to rotate around the light pattern at a light rotation rate dependent on the motor rotation speed of the suction motor. The activating and deactivating of the lights involves causing the lights to emit light and to not emit light. While the lights are activated successively, there may be more than one light illuminated or emitting light at any given instant in time. Alternatively, only a single light is activated at any single instant in time. Thus, the visible light spot may include either a single one of the lights, or a distinct group of the lights, or a moving successive grouping of the lights. In any event, the visible light spot appears to rotate around the circular or annular ring pattern of the lights at the light rotation rate dependent on the motor rotation speed of the suction motor. This can be achieved dependent on the setting of the motor speed control switch (without reference to the actual rotation speed of the motor), or can be based on the actual rotation speed of the motor for example as determined by a sensor. In either case, there is preferably a unique one-to-one allocation of a specific distinct light rotation rate for each available motor rotation speed. The motor rotation speed and thus also the light rotation rate may be variable continuously or in a stepped manner to discrete speed steps.

The above objects have further been achieved according to an embodiment of the invention in a method of operating a vacuum cleaner, which refers to the steps and features carried out in or by the vacuum cleaner apparatus. The method involves controlling the suction motor of the vacuum cleaner to run at a selected motor speed among plural different available motor speeds. The method further involves successively activating and deactivating one or more lights that are arranged preferably in an annular ring-shaped pattern on the vacuum cleaner, at a specified light succession rate among plural different available light succession rates dependent on and allocated to the selected motor speed. This successive activating and deactivating of the lights creates a visible light spot that appears to rotate around the annular ring-shaped pattern of lights at a light rotation rate dependent on the selected motor speed.

An advantage achieved by embodiments of the invention is thus the provision of a readily visible and easily recognizable symbolic indication of the motor rotation speed and therewith the available suction power of the vacuum cleaner. Thereby, the illuminatable motor speed indicator provides a criterium for the user of the vacuum cleaner to easily perceive the actual or selected motor rotation speed and thus suction power. Namely, this makes it possible for the user to optically monitor the vacuum cleaner's suction power, and thus assists the user in appropriately selecting different suction power levels for different applications, for example high suction power for cleaning a carpet, moderate suction power for cleaning upholstery, and lower suction power for cleaning curtains or delicate items in a gentle manner.

According to an advantageous embodiment of the invention, the at least one controller includes a motor controller that is preferably a phase angle controller, an indicator controller to provide a control signal for activating and deactivating the lights, and an evaluating unit preferably embodied as a microcontroller, whereby these components are all preferably incorporated in a control unit. The motor controller and the indicator controller are controlled based on inputs from the evaluating unit, which makes the control determinations based on the manually selected motor speed and/or the input of sensors such as a motor speed sensor, an electrical power sensor monitoring the electrical power drawn by the suction motor, a cumulative operation timer, a temperature sensor, a belt wear sensor, a brush wear sensor, or the like. Thereby, both the suction motor and the illuminatable indicator can be controlled based on these various inputs.

In addition to the apparent rotation of the visible light spot around the light pattern to indicate the rotation speed of the motor, additional operating conditions of the vacuum cleaner can also be detected by the sensors and indicated by appropriate activation of the lights. For example, the lights preferably include lights of different colors, so that various operating conditions can be indicated by illuminating or activating different colored lights depending on the different operating conditions, such as the airflow resistance experienced by the suction motor, the temperature of the suction motor, the bag fill state of a dust filter bag of the vacuum cleaner, a belt wear state of a drive belt of a floor brush of the vacuum cleaner, a brush wear state of the floor cleaning brush roll, and/or a cumulative operating time of the suction motor. These operating states are detected by suitable sensors, which provide corresponding signals to the evaluating unit, which then through the indicator controller activates different colors, patterns, or switching frequencies of the lights to visually or optically indicate the various different operating conditions to the user of the vacuum cleaner.

BRIEF DESCRIPTION OF THE DRAWINGS

In order that the invention may be clearly understood, it will now be described in further detail in connection with an example embodiment thereof, with reference to the accompanying drawings, wherein.

DETAILED DESCRIPTION OF PREFERRED EXAMPLE EMBODIMENTS AND THE BEST MODE OF THE INVENTION

Figure 1:
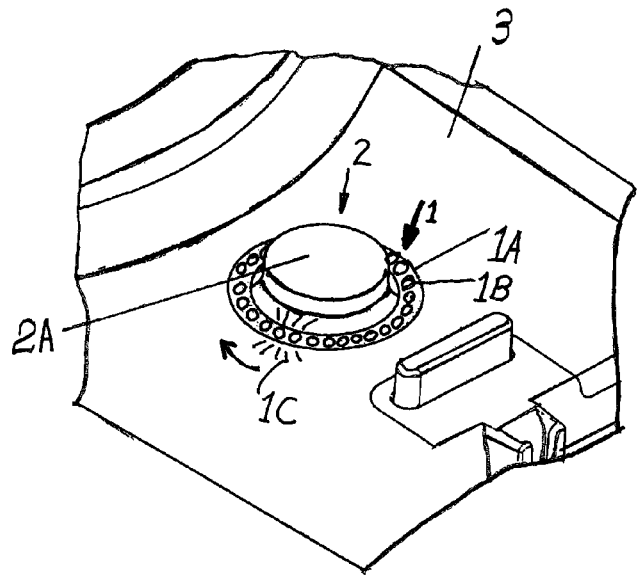
FIG. 1 is a schematic perspective view of a portion of a vacuum cleaner having an illuminatable motor speed indicator including plural activatable lights arranged in an annular ring pattern around a central power and motor speed control switch on a vacuum cleaner housing.

FIG. 1 shows a portion of a vacuum cleaner which is preferably a canister type vacuum cleaner in this embodiment, but may alternatively be an upright type vacuum cleaner or a handheld vacuum cleaner or other configuration of vacuum cleaner. The vacuum cleaner includes a vacuum cleaner housing 3 on which is mounted a motor power and speed control switch 2, which is preferably a rotary switch with a circular control knob 2A that is manually graspable and operable by a user of the vacuum cleaner. An illuminatable motor speed indicator 1 has an annular ring shape, preferably a circular annular ring shape, arranged concentrically around the motor power and speed control switch 2. Alternatively, the motor speed indicator 1 can be located separately or remotely from the motor power and speed control switch 2, and rather than a circular annular ring shape, it can have an oval or oblong ring shape, or a circular shape in the manner of a complete circle for example. The preferred embodiment is illustrated, however.

The motor speed indicator 1 functions to provide a visible or optical indication of the motor rotation speed of the suction motor, and thus the selected or available suction power. The indicator further functions to indicate other operating conditions of the vacuum cleaner, such as a full condition of the dust filter bag or a blockage of the vacuum hose. To provide such optical indications, the indicator 1 includes a plurality of lights 1B arranged in the circular annular ring pattern, and a transparent or translucent cover 1A arranged over the lights 1B. The lights 1B may be any light emitting elements as mentioned above, and are preferably light emitting diodes (LEDs). Furthermore, the LED lights 1B preferably include LEDs of different colors, whereby the indicator can indicate different operating conditions associated with different colors.

To indicate the suction motor rotation speed and thus the suction power, the LED lights 1B are successively activated and deactivated, e.g. energized and de-energized to emit light and not emit light, in succession one after another or groupwise in succession. Thereby, a visible light spot 1C of one or more LED lights 1B appears to rotate around the circular pattern at a rotation rate dependent on, e.g. proportional to, the selected or actual suction motor rotation speed. Thus, at lower power settings of the suction motor, the LED lights 1B rotate slowly around the indicator 1, while at higher power settings the LED lights 1B rotate more quickly around the indicator 1. Thus, the indicator 1 serves as a suction power indicator. When the power or speed setting is in standby mode, for example after the desired power level has been dialed in with the rotary knob 2A but before the suction motor power has been switched on or before the suction motor has reached the selected speed, the lights 1B slowly blink in alternation left to right signifying this operational status.

Figure 2:
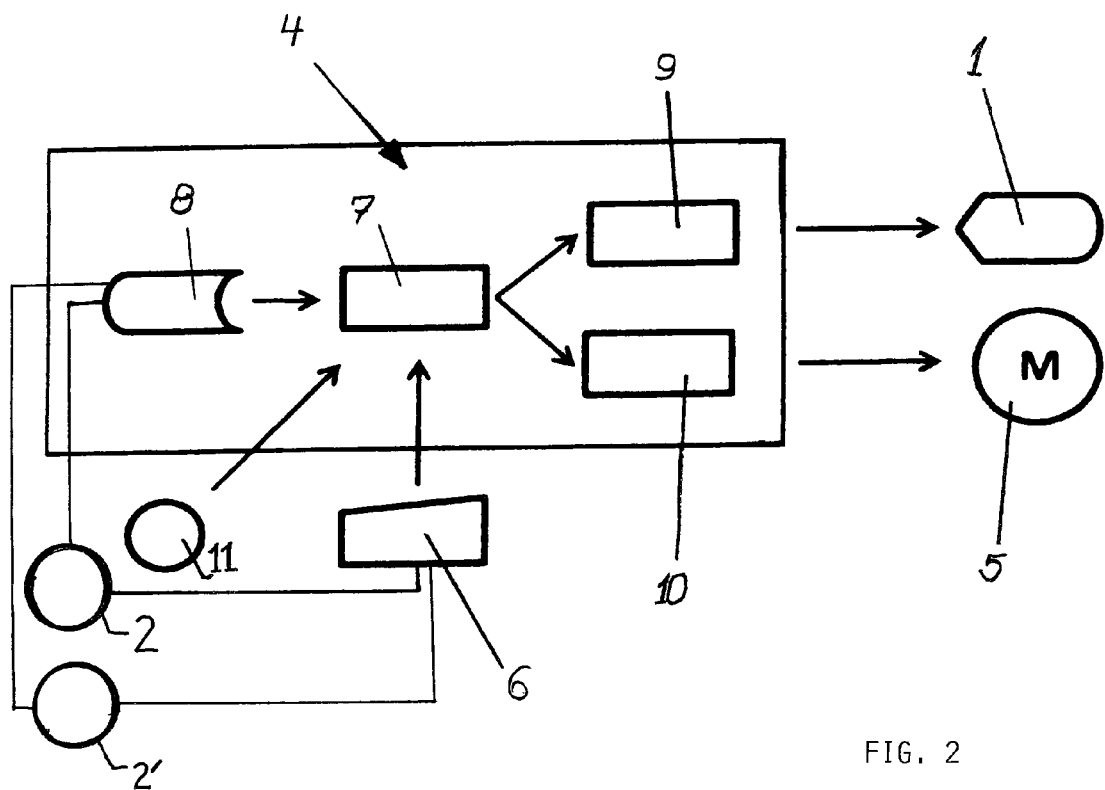
FIG. 2 is a schematic diagram showing the basic components and functional arrangement of a control unit for controlling the motor rotation speed and the activation of the illuminatable indicator.

FIG. 2 schematically shows the basic components and functional arrangement of a control unit 4 that controls both the suction motor 5 and the illuminated motor speed indicator 1. The control unit 4 includes an evaluating unit 7 preferably embodied as a microcontroller 7, which provides output signals to corresponding inputs of an indicator controller 9 and a motor controller 10, for example a motor phase angle controller. The motor controller 10 accordingly controls the rotation speed and thus the suction power of the suction motor 5. Correspondingly, the indicator controller 9 controls the illuminatable motor speed indicator 1 so as to successively activate and deactivate respective ones or groups of the LED lights 1B at a light succession rate that is dependent on the motor rotation speed of the suction motor, and thereby create a visible light spot 1C that appears to rotate around the annular ring pattern of the indicator 1 at a light rotation rate that is dependent on the motor rotation speed of the suction motor 5. The evaluating unit 7 receives input signals from a motor speed selector 6, for example embodied as a rotary switch in the motor power and speed control switch 2, and from a motor power selector or on/off switch 8, for example embodied as a push button switch in the motor speed control switch 2. The evaluating unit 7 further receives an input from at least one sensor 11, which may be any type of sensor disclosed herein or otherwise conventionally known for use in vacuum cleaners.

From the received inputs, the evaluating unit 7 determines the appropriate output signals according to its incorporated switching program embodied in hardware or software or both, in order to drive the indicator controller 9 and the motor controller 10. As shown, the indicator controller 9 and the motor controller 10 respectively control the indicator 1 and the motor 5 parallel to each other based on the control signals received from the evaluating unit 7. Alternatively, the indicator controller 9 can control the indicator 1 based on an actual sensed motor speed signal received directly or indirectly from a motor speed sensor. Furthermore, in addition to controlling the light succession rate and thus the rotation rate of the LED lights 1B as described above, the indicator controller 9 also activates different blinking or flashing patterns and/or different colors of the LED lights 1B in order to indicate different vacuum cleaner operating conditions as represented by the outputs of the sensor 11 or additional sensors.

FIG. 2 further shows a second or auxiliary motor power and speed control switch 2' which may be connected parallel (or in a 2-way switch arrangement, not shown) to the primary motor power and speed control switch 2 but located physically remotely from the switch 2. For example, the auxiliary switch 2' can be provided on the hose handle at the top end of the floor cleaning wand of a canister type vacuum cleaner, while the primary switch 2 is provided on the vacuum cleaner housing 3 of the canister unit. This provides a very comfortable, convenient and user-friendly arrangement for the user of the vacuum cleaner, who can switch on the suction motor and adjust the suction power either at the canister unit or at the hose handle. Alternatively, the primary switch 2 with the indicator 1 around it may be provided in the hose handle or elsewhere on the vacuum cleaner. The preferred arrangement is shown, however.

The appearance of the visible light spot 1C rotating or circulating around the annular ring shape of the indicator 1 provides an easily visible and easily understandable indication of the motor rotation speed and thus the suction power. This is very sensible and comfortable for the user of the vacuum cleaner, who can quickly understand the meaning of the illuminated indication even without having to read a user instruction manual or the like, because the indicator 1 is physically closely associated with the motor speed control switch 2, the rotary operation of the switch 2 and the rotation of the suction motor are conceptually associated with the rotation of the visible light spot 1C, and the otherwise perceived varying motor speed (by hearing) or suction power (by hearing or feeling) is perceptively correlated with the varying light rotation rate of the rotation of the visible light spot 1C. This facilitates the user's selection of an appropriate level of suction power for different uses of the vacuum cleaner.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A vacuum cleaner comprising:
   a vacuum cleaner housing;
   a suction motor in said vacuum cleaner housing;
   a motor speed control switch;
   an illuminatable motor speed indicator comprising a plurality of lights arranged in a light pattern selected from the group consisting of a circular pattern and an annular ring pattern; and
   at least one electronic or electrical controller that is conductively connected to said suction motor, to said motor speed control switch and to said lights; and
   wherein said at least one controller is or are arranged, configured and adapted to control a motor rotation speed of said suction motor dependent on and responsive to a setting of said motor speed control switch, and to successively activate and deactivate respective ones or groups of said lights at a light succession rate dependent on said motor rotation speed or dependent on said setting of said motor speed control switch and to thereby create a visible light spot that appears to rotate around said light pattern at a light rotation rate related to said motor rotation speed of said suction motor.

2. The vacuum cleaner according to claim 1, wherein said motor speed control switch is a manually operable motor speed control switch that is arranged on said vacuum cleaner housing.

3. The vacuum cleaner according to claim 2, further comprising an auxiliary motor speed control switch that is located remotely from said motor speed control switch and that is conductively connected to said at least one controller.

4. The vacuum cleaner according to claim 2, wherein said motor speed indicator is arranged on said vacuum cleaner housing, said manually operable motor speed control switch comprises a rotary switch and includes a manually graspable rotatable switch knob, and said light pattern is said annular ring pattern that is a circular annular ring pattern of said lights arranged concentrically around said switch knob on said vacuum cleaner housing.

5. The vacuum cleaner according to claim 1, wherein said light pattern is said annular ring pattern arranged concentrically around said motor speed control switch.

6. The vacuum cleaner according to claim 1, wherein said motor speed indicator further comprises a circular or ring-shaped, transparent or translucent cover arranged covering said lights.

7. The vacuum cleaner according to claim 1, wherein said plurality of lights includes respective lights of different colors relative to one another.

8. The vacuum cleaner according to claim 7, further comprising a sensor that is conductively connected to said at least one controller, and that is arranged, configured and adapted to sense an operating condition of said vacuum cleaner and to provide to said at least one controller a signal indicative of said operating condition, and wherein said at least one controller is or are adapted to activate and deactivate said respective lights of said different colors dependent on and responsive to said signal indicative of said operating condition.

9. The vacuum cleaner according to claim 8, wherein said at least one controller comprise a motor controller that has an output conductively connected to said suction motor, an indicator controller that has an output conductively connected to said lights, and an evaluating unit that has respective inputs conductively connected to said motor speed control switch and to said sensor and that has at least one output conductively connected to respective inputs of said motor controller and said indicator controller.

10. The vacuum cleaner according to claim 1, wherein said at least one controller comprise a motor controller that has an output conductively connected to said suction motor, an indicator controller that has an output conductively connected to said lights, and an evaluating unit that has an input conductively connected to said motor speed control switch and that has at least one output conductively connected to respective inputs of said motor controller and said indicator controller.

11. The vacuum cleaner according to claim 10, wherein said evaluating unit comprises an electronic microcontroller.

12. The vacuum cleaner according to claim 10, wherein said motor controller is a motor phase angle controller.

13. The vacuum cleaner according to claim 10, wherein said motor controller, said indicator controller and said evaluating unit are incorporated together in a control unit.

14. The vacuum cleaner according to claim 1, wherein said lights are light emitting diodes.

15. The vacuum cleaner according to claim 1, wherein said at least one controller is or are arranged, configured and adapted to activate and deactivate said lights dependent on and responsive to said setting of said motor speed control switch.

16. A method of operating the vacuum cleaner according to claim 1, comprising:
   a) using said at least one controller, controlling said suction motor of said vacuum cleaner to run at a selected motor rotation speed among plural different available motor rotation speeds; and
   b) successively activating and deactivating said ones or said groups of said lights at a specified light succession rate among plural different available light succession rates dependent on and allocated to said selected motor rotation speed, wherein different ones of said light succession rates are respectively allocated to different ones of said motor rotation speeds, and wherein said successive activating and deactivating of said lights creates a visible light spot that appears to rotate around said light pattern at said light rotation rate dependent on said selected motor rotation speed.

17. The method according to claim 16, wherein said lights include respective lights of respectively at least two different colors, said method further comprising:
   c) detecting an operating condition of said vacuum cleaner selected from the group consisting of an airflow resistance experienced by said suction motor, a temperature of said suction motor, a bag fill state of a filter bag of said vacuum cleaner, a belt wear state of a drive belt of said vacuum cleaner, a brush wear state of a floor cleaning brush roll of said vacuum cleaner, and a cumulative operating time of said suction motor; and
   d) said successive activating of said lights involves activating lights of a selected one of said colors dependent on and allocated to said operating condition that has been detected.

18. The method according to claim 16, wherein said controlling of said suction motor and said successive activating and deactivating of said lights is performed by said at least one controller comprising an electronic controller dependent on and in response to at least one input signal received from said motor speed control switch being a manually operable power control switch of said vacuum cleaner.

19. The method according to claim 16, wherein said plural different available motor rotation speeds form a continuously variable motor rotation speed range, said plural different available light succession rates form a continuously variable light succession rate range, and said light rotation rate can have any value in a continuously variable light rotation rate range.

20. The method according to claim 16, wherein said plural different available motor rotation speeds are discrete stepped motor rotation speeds, said plural different available light succession rates are discrete stepped light succession rates, and said light rotation rate can have any discrete stepped value in a discontinuous stepped light rotation rate range.

* * * * *